Aug. 12, 1941. W. J. TIERNEY Re. 21,876
HINGE AND METHOD OF MAKING MEMBERS THEREFOR
Original Filed Feb. 5, 1940 2 Sheets-Sheet 1
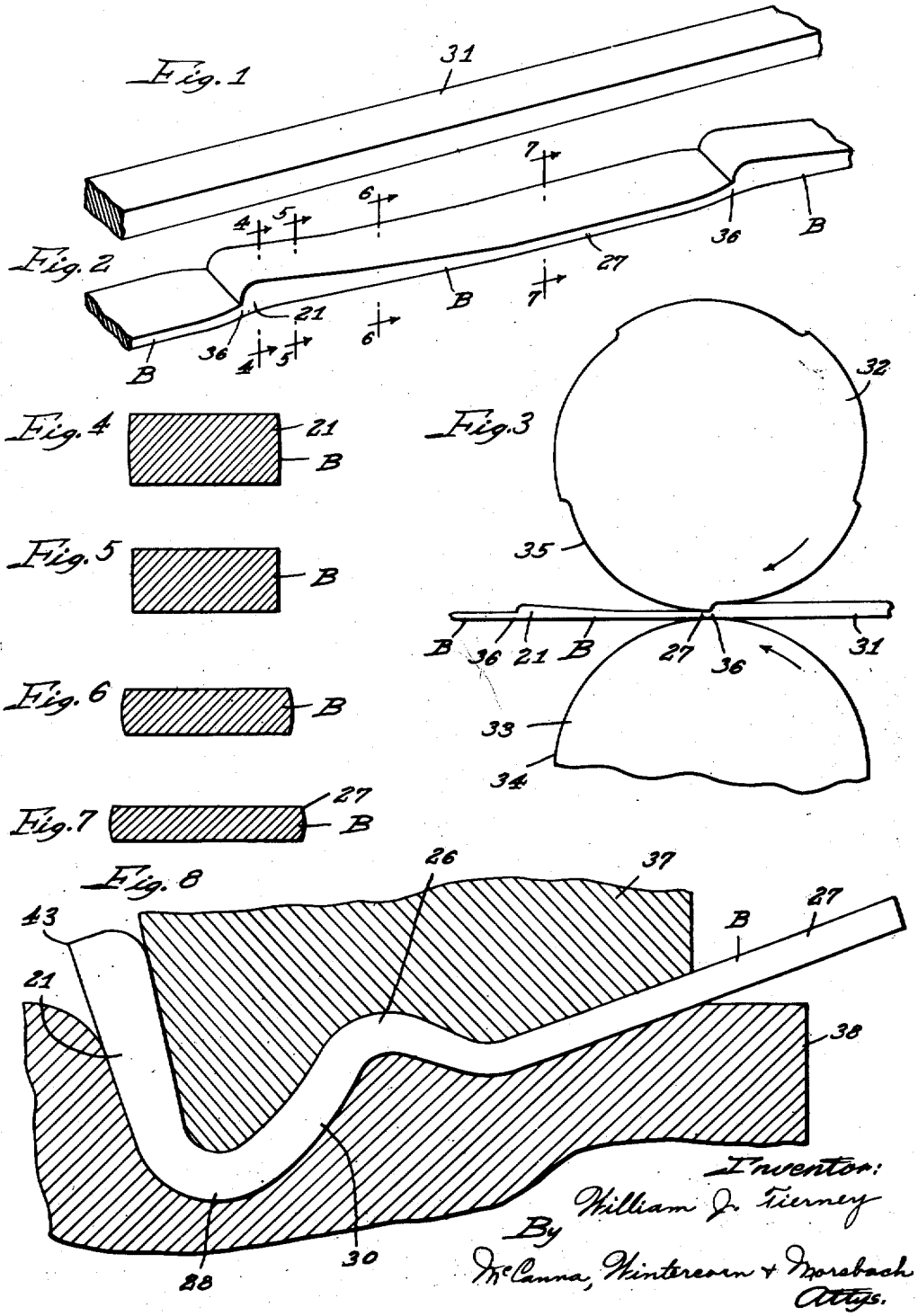
Inventor:
William J. Tierney
By
McCanna, Wintercorn & Morsbach
Attys.

HINGE AND METHOD OF MAKING MEMBERS THEREFOR

Original Filed Feb. 5, 1940 2 Sheets-Sheet 2

Inventor:
William J. Tierney
By
McManna, Wintercorn & Morsbach
Attys.

Reissued Aug. 12, 1941

Re. 21,876

UNITED STATES PATENT OFFICE 21,876

HINGE AND METHOD OF MAKING MEMBERS THEREFOR

William J. Tierney, Rockford, Ill., assignor to The Atwood Vacuum Machine Company, a copartnership composed of Seth B. Atwood and James T. Atwood, Rockford, Ill.

Original No. 2,235,241, dated March 18, 1941, Serial No. 317,283, February 5, 1940. Application for reissue March 29, 1941, Serial No. 385,794

14 Claims. (Cl. 29—11)

This invention relates to hinges, and is particularly concerned with an improved method of making hinge members.

The principal object of my invention is to provide a hinge member of varying width and thickness, for example, wider and thinner in the attaching portion and narrower and thicker in the pintle end portion and of varying width and thickness at intermediate points, these members being produced from bar stock of uniform width and thickness, by passing the same between rolls, one with a plain periphery and the other with a cam-shaped periphery, conformed to give the hinge blanks the desired thicknesses at the various points along the length thereof, whereby to permit speedy and economical production of hinge members of irregular form, a number of them at a time in each strip, the strip being arranged to be cut after rolling so as to provide a number of specially formed blanks. This method, therefore, enables the production of hinge blanks in which the grain runs lengthwise of the piece, thereby giving much greater strength and facilitating production by permitting bending, without danger of weakening the piece, as well as making it possible to straighten a bent hinge without danger of breakage. When bar stock is employed, the cross-sectional size of which is sufficient for the thick and narrow pintle end portion as well as the thinner and wider attaching portion of the hinge blanks, it is obvious that the combination rolling and forming operation produces a plurality of blanks in each bar, each blank having a thick and narrow pintle end portion and a thinner and wider attaching portion, the blank being tapered from the attaching portion to the pintle end portion.

Another object is to provide hinge blanks in the manner described, each of which subsequent to the initial rolling and forming is stamped between dies in a transverse plane to bend it longitudinally to the desired shape, and which thereafter is coin-pressed between other dies in the plane of the blank to true up and size to width the section at various points along the length of the blank and either straighten it or give it a desired offsetting of the pintle end with respect to the other end. The bending gives "work hardness" and consequent stiffness in the outer or pintle end portion of the hinge member so that it is not as apt to sag and take a set in bent form. The rolling also makes the member closer grained and harder at the pintle bearing so that it will better resist wear, the grain curving around the pintle hole.

The invention is illustrated in the accompanying drawings, in which—

Figure 1 is a perspective view of a portion of the bar stock used in the production of the present hinge members;

Fig. 2 is a view of the same portion of the bar stock as it appears after the initial rolling and forming operation illustrated in Fig. 3, the latter showing the two rolls with a portion of the bar therebetween;

Figs. 4–7 are sections on the correspondingly numbered lines of Fig. 2;

Fig. 8 is a sectional view showing the dies used in the longitudinal bending of the blanks;

The same reference numerals are applied to corresponding parts throughout the views.

Figure 10:
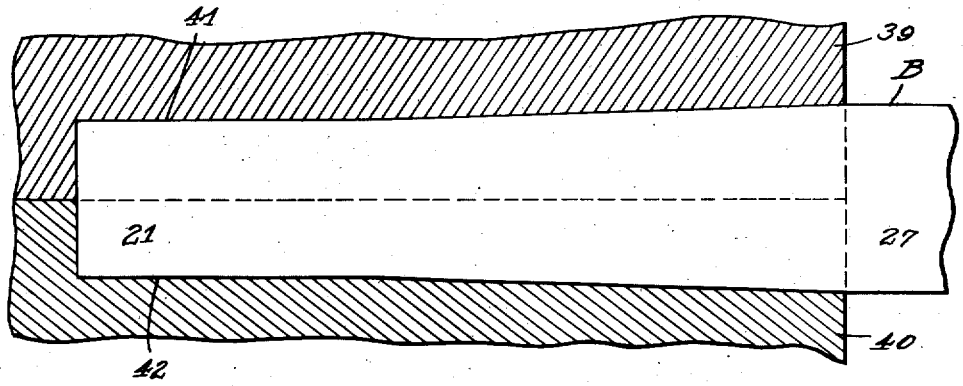
Figure 11:
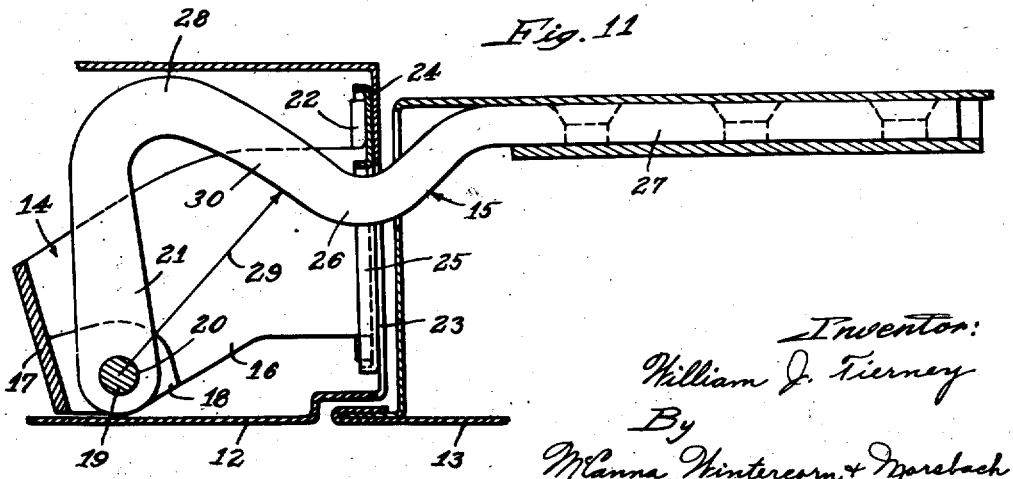
Fig. 11 is a horizontal section through a portion of an automobile body and door illustrating a hinge of the type using the hinge members, the production of which is illustrated in Figs. 1–10.

Referring briefly to Fig. 11 for an understanding of the hinge, 12 designates a portion of the body and 13 a portion of the door of an automobile. The hinge shown comprises an outer member 14 and an inner member 15 mounted on the body and door respectively. The outer member 14 is formed from sheet metal to a generally U-shaped cross-section so as to provide opposed substantially horizontal parallel walls, the lower one of which appears at 16 interconnected by a substantially vertical wall 17. The horizontal walls have embossed portions 18 forming supports for the pintle 19 received in a bearing hole 20 provided therefor in the pintle end portion 21 of the inner hinge member 15. The walls 16 are also flanged outwardly as at 22 to provide attaching portions for bolting, riveting, or otherwise securing the outer hinge member 14 to the body pillar, a portion of which appears at 23. A sheet metal face plate 24, suitably welded to the attaching portions 22, is cut away as at 25 to provide operating clearance for the inner hinge member 15. The inner hinge member 15 has an offset portion 26 next to its attaching end portion 27 where it extends through the cut-out portion 25 of the plate 24, whereby to provide operating clearances for the gooseneck portion 28 when the door closes. The gooseneck portion 28 is next to the offset portion 26, and its radius 29 is long enough so that the portion 30 clears the body pillar in the opening of the door. The pintle end portion 21 provided on the other half of the gooseneck portion 28 is approximately at right angles to the attaching end portion 27, and the door 13 is accordingly free to swing through approximately 90° from closed to open position. Now, it can easily be seen by inspection of the inner hinge member 15 in Fig. 11 that it is desirable to have the attaching portion 27 wide and of relatively thin section so as to provide proportionately broader surface engagement with the door to which it is secured. On the other hand, it is desirable to have the pintle end portion of narrower and thicker section, the thickened section permitting provision of a pintle bearing hole 20 of large enough diameter without reducing the wall thickness around the bearing hole to too great an extent. The section between the attaching portion 27 and the pintle end portion 21 is preferably of gradually increasing thickness outwardly and gradually increasing width inwardly, as indicated in Figs. 9, 10 and 11.

Referring now to Figs. 1–3, 31 designates the steel bar stock from which blanks B are produced by rolling and forming between rollers 32 and 33 in the manner shown in Fig. 3. The roller 33 has a plain periphery 34 but the periphery 35 of the roller 32 is profiled or cam-shaped to conform to the shape of the blanks to be produced, the periphery 35 having cam surfaces for the formation of five blanks in each turn. The bar 31 has a cross-section approximately the same as the pintle end portion 21 of the blank. The attaching end portion 27 of the blank, however, is much thinner and wider and is given that form by pressure between the rollers, the rollers 32 and 33 being operated at the same speed in the direction of the arrows, and being supported in fixed spaced relation. The intermediate portions of the blank between the ends 21 and 27 are of varying thickness and width, the blank decreasing in width but increasing in thickness gradually from the attaching end portion 27 toward the pintle end portion 21, as previously indicated and as also appears from a comparison of Figs. 4, 5, 6 and 7, and the roller 32 has its periphery 35 shaped accordingly. This rolling and forming operation is done hot.

The blanks are cut from the bar by shearing the same transversely at the points 36. In some instances the attaching end portions 27 will require milling off along the longitudinal edges to square up these edges and also get down to the desired width to fit the hinge seats on the car door. Then, too, the extremities of the end portions 27 will ordinarily be milled off square and bring the blank down to the desired length. These trimming operations are simple and inexpensive. The rest of the blank is in accordance with my invention arranged to be trued up and sized to width by a coin press operation after the blank has been bent between dies to give the outer end portion the desired angularity and lateral offset, as shown in Fig. 8. The dies in Fig. 8 are numbered 37 and 38. These dies bend the pintle end portion 21 substantially at right angles to the attaching end portion 27, and also form the gooseneck bend 28 and offset bend 26 in proper relationship to said end portions while the blank B is still in a semi-finished condition. This bending results in "work hardness" and as a result the hinge member is stiffer and is not apt to sag and take a set in bent form.

Figure 9:
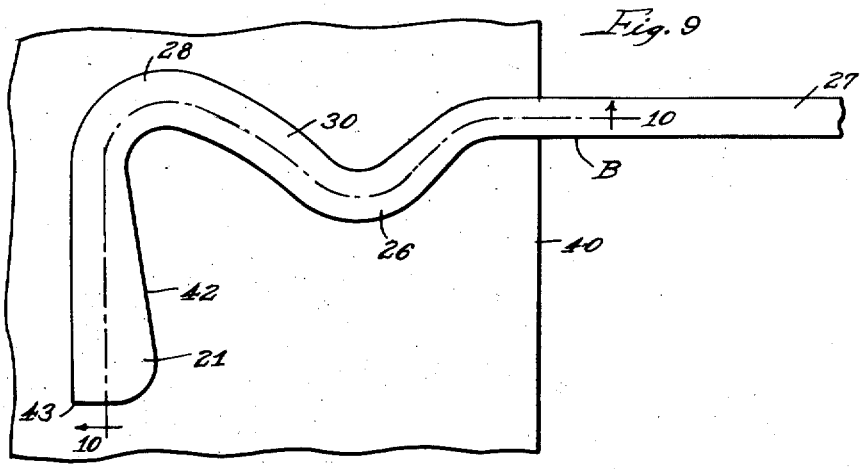
Fig. 9 is a plan view of the bent blank set in the lower die recess for the coin press operation illustrated in Fig. 10, the latter view being taken generally on the line 10—10 of Fig. 9.

The dies 39 and 40 shown in Figs. 9 and 10 are coining dies, and their recesses 41 and 42 are accurately formed so that when the dies are brought together under heavy pressure with the blank B inserted therebetween, the blank is trued up and either straightened, if bent slightly out of line, where a hinge member having the opposite ends on a line is desired, as is true of the one shown in Figs. 9 and 10, or, where it is desired to have the pintle end portion 21 as well as the complete gooseneck portion 28—30 bent into vertically offset relation with respect to the attaching end portion 27, this bending can be taken care of efficiently in this same operation. This coin pressing results in a greatly hardened surface on the upper and lower longitudinal edges, which means added life inasmuch as these surfaces slidably engage the bosses 18 in the outer hinge member.

The blank as it comes from the coin press is ready for use as soon as the pintle bearing hole 20 is drilled therein, and when the corner 43 on the extremity of the pintle end portion is rounded off by milling or grinding to conform this portion to the radius of the other side of the blank, that other radius it being recalled being formed in the initial rolling and forming operation by the periphery 35 of the roller 32. The rolling results in the compacted grain throughout the length of the blank with resultant increased strength, and the grain is further compacted in the pintle end portion when the blank is subsequently pressed between dies with the blank in an edgewise position therebetween, thus concentrating the greatest strength in that portion of the hinge member projecting from the body of the car where the greatest strains occur under service conditions. A further important advantage in the initial roll evident from an inspection of Fig. 3 comes from the fact that the grain is not only compacted at the vicinity of the pintle hole 20, but the grain actually is curved around the pintle hole, thus greatly increasing the resistance to wear.

It is believed the foregoing description conveys a good understanding of the objects and advantages of my invention. The appended claims have been drawn with a view to covering all legitimate modifications and adaptations.

I claim:

1. The method of making hinge members which consists in subjecting a bar of rectangular cross-section to a combination rolling and forming operation between rollers, whereby to form from a single bar a plurality of connected blank portions having the grain running lengthwise of all of said blank portions, each blank portion as a result of the rolling operation having increased width and decreased thickness at one end and intermediate thicknesses and widths intermediate the ends and substantially the original width and thickness of the bar at the other end, then cutting the blanks from the bar, then bending the last named end portion into substantially right angled relation to the first named end portion, and drilling a pintle hole crosswise of the last named end portion.

2. The method of making hinge members which consists in subjecting a bar of rectangular cross-section to a combination rolling and forming operation between rollers, whereby to form from a single bar a plurality of connected blank portions, each of increased width and decreased thickness at one end and intermediate thicknesses and widths intermediate the ends and substantially the original width and thickness of the bar at the other end, then cutting the blanks from the bar, then bending the last named end portion into substantially right angled relation to the first named end portion to define a pintle end portion, then subjecting at least the pintle end portion to pressure between dies to size to width and true up the edges of this portion of the blank, and finally drilling a pintle hole crosswise of the extremity of the pintle end portion.

3. The method of making hinge members which consists in subjecting a bar of rectangular cross-section to a combination rolling and forming operation between rollers, whereby to form from a single bar a plurality of connected blank portions, each of increased width and decreased thickness at one end and intermediate thicknesses and widths intermediate the ends and substantially the original width and thickness of the bar at the other end, then cutting the blanks from the bar, then bending the last named end portion into substantially right angled relation to the first named end portion to define a pintle end portion, then subjecting at least the pintle end portion to pressure between dies to size to width and true up the edges of this portion of the blank, the first named end portion being trimmed off along its longitudinal edges and across the end thereof to specified dimensions, and finally drilling a pintle hole crosswise of the extremity of the pintle end portion.

4. The method of making hinge members which consists in subjecting a bar of rectangular cross-section to a combination rolling and forming operation between rollers, whereby to form from a single bar a plurality of connected blank portions, each of increased width and decreased thickness at one end and intermediate thicknesses and widths intermediate the ends and substantially the original width and thickness of the bar at the other end, then cutting the blanks from the bar, then bending the last named end portion of the individual blanks so as to provide a gooseneck-shaped pintle end portion and an intermediate offset portion, the pintle end of which is substantially at right angles to the first named end portion, then subjecting at least the pintle end portion to pressure between dies to size to width and true up the edges of this portion of the blank, and finally drilling a pintle hole crosswise of the extremity of the pintle end portion.

5. The method of making hinge members which consists in subjecting a bar of rectangular cross-section to a combination rolling and forming operation between rollers, whereby to form from a single bar a plurality of connected blank portions, each of increased width and decreased thickness at one end and intermediate thicknesses and widths intermediate the ends and substantially the original width and thickness of the bar at the other end, then cutting the blanks from the bar, then bending the last named end portion of the individual blanks so as to provide a gooseneck-shaped pintle end portion and an intermediate offset portion, the pintle end of which is substantially at right angles to the first named end portion, then subjecting at least the pintle end portion to pressure between dies to size to width and true up the edges of this portion of the blank, the first named end portion being trimmed off along its longitudinal edges and across the end thereof to specified dimensions, and finally drilling a pintle hole crosswise of the extremity of the pintle end portion.

6. As an article of manufacture, a rolled hinge member for a vehicle door hinge formed from a single elongated piece of rectangular section bar stock having the grain running lengthwise, the said hinge member comprising an attaching shank portion at one end thereof and a pintle-receiving portion at the other end thereof, the pintle-receiving portion being of relatively thick and narrow section, corresponding substantially to the section of the original bar stock, and the attaching end portion being formed to relatively thin and wide section so as to compact the grain transversely of said portion, and the intermediate portion of said member being formed to decreasing width and increasing thickness from the attaching portion toward the pintle-receiving portion so as to compact the grain transversely of said intermediate portion.

7. The method of making hinge members which consists in subjecting a bar of rectangular cross-section to a combination rolling and forming operation between rollers, whereby to form from a single bar a plurality of connected blank portions having the grain running lengthwise of all of said blank portions, each blank portion as a result of the rolling operation having increased width and decreased thickness at one end and intermediate thicknesses and widths intermediate the ends and substantially the original width and thickness of the bar at the other end, then cutting the blanks from the bar, and drilling a pintle hole crosswise of the last named end portion.

8. As an article of manufacture, a rolled hinge member for a vehicle door hinge formed from a single elongated piece of rectangular section bar stock having the grain running lengthwise, the said hinge member comprising an attaching shank portion at one end thereof and a pintle-receiving portion at the other end thereof, the pintle-receiving portion being of relatively thick and narrow section, corresponding substantially to the section of the original bar stock, and the attaching end portion being formed to relatively thin and wide section so as to compact the grain transversely of the said portion, and the intermediate portion of said member being formed to decreasing width and increasing thickness from the attaching portion toward the pintle-receiving portion so as to compact the grain transversely of said intermediate portion, at least the pintle end portion having the grain compacted edgewise of said portion by pressure between dies.

9. The method of making hinge members which consists in subjecting a bar of rectangular cross-section to a combination rolling and forming operation between rollers, whereby to form from a single bar a plurality of connected blank portions, each of increased width and decreased thickness at one end and intermediate thicknesses and widths intermediate the ends and substantially the original width and thickness of the bar at the other end, then cutting the blanks from the bar, then subjecting at least the last named end portion to pressure between dies to size to width and true up the edges of this portion of the blank, and finally drilling a pintle hole crosswise of the extremity of the last named end portion.

10. The method of making hinge members which consists in subjecting a bar to a combination rolling and forming operation between rollers, whereby to form from a single bar a plurality of connected blank portions having the grain running lengthwise of all of said blank portions, each blank portion as a result of the rolling operation being relatively thin and wide at one end and of intermediate thicknesses and widths intermediate the ends and being relatively thicker and narrower at the other end, then cutting the blanks from the bar, and drilling a pintle hole crosswise of the last named end portion.

11. The method of making hinge members which consists in subjecting a bar to a combination rolling and forming operation between rollers, whereby to form from a single bar a plurality of connected blank portions having the grain running lengthwise of all of said blank portions, each blank portion as a result of the rolling operation being relatively thin and wide at one end and of intermediate thicknesses and widths intermediate the ends and being relatively thicker and narrower at the other end, then cutting the blanks from the bar, then bending the last named end portion into substantially right angled relation to the first named end portion, and drilling a pintle hole crosswise of the last named end portion.

12. The method of making hinge members which consists in subjecting a bar to a combination rolling and forming operation between rollers, whereby to form from a single bar a plurality of connected blank portions, each relatively thin and wide at one end and of intermediate thicknesses and widths intermediate the ends and being relatively thicker and narrower at the other end, then cutting the blanks from the bar, then subjecting at least the last named end portion to pressure between dies to size to width and true up the edges of this portion of the blank, and finally drilling a pintle hole crosswise of the extremity of the last named end portion.

13. As an article of manufacture, a rolled hinge member for a vehicle door hinge formed from a single elongated piece of bar stock having the grain running lengthwise, the said hinge member comprising an attaching shank portion at one end thereof and a pintle-receiving portion at the other end thereof, the pintle-receiving portion being of relatively thick and narrow rectangular section, and the attaching end portion being formed to relatively thin and wide rectangular section so as to compact the grain transversely of said portion, and the intermediate portion of said member being formed to decreasing width and increasing thickness from the attaching portion toward the pintle-receiving portion so as to compact the grain transversely of said intermediate portion.

14. As an article of manufacture, a rolled hinge member for a vehicle door hinge formed from a single elongated piece of bar stock having the grain running lengthwise, the said hinge member comprising an attaching shank portion at one end thereof and a pintle-receiving portion at the other end thereof, the pintle-receiving portion being of relatively thick and narrow rectangular section, and the attaching end portion being formed to relatively thin and wide rectangular section so as to compact the grain transversely of the said portion, and the intermediate portion of said member being formed to decreasing width and increasing thickness from the attaching portion toward the pintle-receiving portion so as to compact the grain transversely of said intermediate portion, at least the pintle end portion having the grain compacted edgewise of said portion by pressure between dies.

WILLIAM J. TIERNEY.